US007191890B2

(12) United States Patent
Thierer et al.

(10) Patent No.: US 7,191,890 B2
(45) Date of Patent: Mar. 20, 2007

(54) ESCALATOR OR MOVING WALKWAY WITH HANDRAIL ENTRY, HANDRAIL ENTRY OF SUCH AN ESCALATOR OR MOVING WALKWAY, AND METHOD OF REDUCING A GAP IN THE HANDRAIL ENTRY

(75) Inventors: Walter Thierer, Vienna (AT); Paul Sailer, Vienna (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 11/189,414

(22) Filed: Jul. 26, 2005

(65) Prior Publication Data

US 2006/0016666 A1 Jan. 26, 2006

(30) Foreign Application Priority Data

Jul. 26, 2004 (EP) .................................. 04405476

(51) Int. Cl.
*B65G 15/00* (2006.01)
*B65G 17/00* (2006.01)
*B66B 23/22* (2006.01)
*B66B 23/24* (2006.01)

(52) U.S. Cl. ........................ 198/338; 198/337; 198/335

(58) Field of Classification Search ................ 198/335, 198/336, 337, 338
See application file for complete search history.

(56) References Cited

U.S. PATENT DOCUMENTS

| | | | | |
|---|---|---|---|---|
| 2,846,045 | A * | 8/1958 | Fowler | 198/323 |
| 4,619,355 | A * | 10/1986 | Adrian et al. | 198/323 |
| 5,064,047 | A * | 11/1991 | Moldenhauer et al. | 198/338 |
| 5,259,493 | A * | 11/1993 | Johnson | 198/338 |
| 6,131,719 | A * | 10/2000 | Gore | 198/326 |
| 6,141,818 | A * | 11/2000 | Weihrauch | 15/167.1 |
| 6,623,200 | B1 * | 9/2003 | Gueret | 401/129 |

* cited by examiner

*Primary Examiner*—Gene O. Crawford
*Assistant Examiner*—Ramya G. Prakasam
(74) *Attorney, Agent, or Firm*—Schweitzer Cornman Gross & Bondell LLP

(57) ABSTRACT

An escalator or moving walkway with a handrail and a handrail entryway has a finger contact protection cover, wherein the finger contact protection cover includes corrugated bristles. The corrugated bristles allow the gap between the handrail and the entryway to be minimized. The bristle construction also provides improved tactile feedback when a user's hand contacts the bristles, allowing the hand to be more quickly removed from the handrail and contact with the bristles, avoiding potential injury.

9 Claims, 4 Drawing Sheets

ESCALATOR OR MOVING WALKWAY WITH HANDRAIL ENTRY, HANDRAIL ENTRY OF SUCH AN ESCALATOR OR MOVING WALKWAY, AND METHOD OF REDUCING A GAP IN THE HANDRAIL ENTRY

The invention relates to an escalator or moving walkway with a handrail and a handrail entry having a finger contact protection cover, a handrail entry for such an escalator, and a method of reducing a gap in the handrail entry.

BACKGROUND OF THE INVENTION

In the description that follows the expression “escalator” also is used to describe a moving walkway and the expression “step” also embraces moving walkway plates.

The steps of a conventional escalator are fastened to two transport chains and form together therewith an endless, circulating step belt, which runs over a respective pair of transport chainwheels at each of the two ends of the escalator, wherein one transport chainwheel pair belongs to a drive station and drives the step belt and the other chainwheel pair is part of a step belt deflecting station. The individual steps of the step belt are equipped with two front and two rear guide rollers, at which the steps are guided by guide and deflecting cams, which are predominantly fastened to the support construction of the escalator in a positionally-dependent defined location.

In escalators or moving walkways the handrails must, according to regulation, move synchronously or substantially synchronously with the step belt or plate belt. The advance of the handrails relative to the step belt amount can amount at most to 10%.

The handrails consist of endless rubber belts or plastic material belts which are provided with tensile carriers and reinforcements, have a C-shaped cross-section and slide on specially shaped handrail guide profiles. Other materials can also be used.

Whereas in the past wide and massive closed sheet steel balustrades were commonplace, in more recent times balustrades of safety glass have increasingly gained acceptance. These glass balustrades make possible a construction appearing slimmer and lighter without prejudicing the required stability.

In the case of escalators and moving walkways of that kind there is placed on the glass plate, which forms the balustrade a clamping plate which mounts the handrail by way of roller bearings and serves as a sliding guide. Laterally of the balustrade the clamping plate extends in a U-shape respectively towards the ends of the C-shaped cross-section of the handrail. In order to provide compensation for tolerances a gap must be left between the clamping plate and the handrail, since a handrail end which bears there would produce considerable friction which would lead to unacceptable heating and would increase required drive power as well as wear.

For this reason a gap or air gap has to be left between the handrail entry and handrail. The handrail entry is an opening in the balustrade through which the endless handrail is guided in order to be led back.

A gap or air gap of that kind is a safety risk. Due to the play present at both sides, the gap width can reach finger thickness, so that insertion of a finger, particularly by a child, and thus the risk of pinching and other injuries for the passenger, are not excluded.

Accordingly, efforts have been undertaken to produce a deflector surface to prevent finger insertion into the gap. In the case in a escalator or a moving walkway with a glass balustrade there has been designed, at the upper stair (framework) head and at the lower stair (framework) head or at the upper moving walkway head and at the lower moving walkway head a respective right and left finger contact protection covers. It has become known from U.S. Pat. No. 3,835,977 to provide the finger protection cover of the handrail entry of an escalator with bristles.

A disadvantage of such a solution is that the bristles have a very short service life due to the constant wear by the handrail. The forces exerted by the handrail or the hands of passengers damage the structure of the bristles, which have insufficient stability of shape. Such bristles also have to be designed to be thin and then have poor discernability to the view of passengers.

The present invention thus has an objective of creating an escalator or moving walkway having a handrail contact protection cover which enables improved safety against insertion of objects into a handrail entry. Further objectives of the invention are to provide such a cover that may be manufactured simply and economically, which has a long service life, and which has exhibited constant protection, and a stable shape.

BRIEF DESCRIPTION OF THE INVENTION

In accordance with the foregoing and other objectives, the invention provides an escalator or moving walkway with a handrail and a handrail entry that has a finger contact protection cover corrugated bristles. The finger contact protection cover is located in the region of the escalator having an opening through which the handrail is guided.

The term corrugated bristles is meant to include bristles which are not straight in a longitudinal direction and which have a wavy structure. This is in contrast to conventional bristles which are used for escalators and which are straight in the longitudinal direction.

Mechanical tests have shown that friction with the handrail is reduced while the corrugated bristles offer a higher degree of stability of shape and have a longer service life than straight bristles. The “wave” structure increases the mechanical strength of the bristles and enables better distribution of the forces exerted by the handrail or the hands of passengers. The wave structure stabilizes the bristles against distortion obliquely relative to their longitudinal axis as compared to straight bristles. If straight bristles are pressed in the longitudinal axis, they distort and can no longer exert a counterforce. In contrast thereto, corrugated bristles accept pressure in the longitudinal axis as a resilient stress which is stored in the waves and maintains the bristles in their orientation; the bristles are not distorted.

In an unexpected manner the ends of the bristles exert on a passenger, should the passenger on occasion place fingers in the protected region, sensory stimuli of such a kind that the passenger involuntarily rapidly withdraws his or her hand and thus is further protected against the risk of trapping and squeezing. The sensory stimuli produced by the corrugated bristles in compression are, thanks to their higher degree of mechanical stability, stronger than those produced by straight bristles, since the corrugated bristles cannot be simply bent about their longitudinal axes.

In a preferred embodiment of the invention the exposed or protected end of the bristles may be rounded. This is advantageous because the risk of injury to passenger fingers upon contact with the bristles is diminished. In the case of contact, such bristles do not cause any wounds or woundings to the passenger.

The corrugated bristles of the invention substantially reduce the gap between the handrail and the finger contact protection cover. This advantageously further reduces the risk of penetration of a passenger finger into the air gap.

Through the use of the corrugated bristles there is a more luxuriant accumulation of the bristles is produced, along with increased protection from view without, however, having to undertake an increase in the bristle quantity. The handrail entry or handrail introduction is tighter for the same number of bristles. Better protection against finger insertion is thereby achieved.

In a further preferred embodiment, the handrail entry is mounted at an end cap fastened to the balustrade. This construction enables the quick and simple mounting of the corrugated bristles at the escalator and therefore reduces production and mounting costs.

A finger contact protection cover with corrugated bristles in accordance with the invention enables a rapid, simple and economic equipping of a conventional escalator with a new handrail entry with the corrugated bristles. This allows the conventional escalator to be modernized and the risk of penetration of a passenger finger into the air gap between the handrail and the finger contact protection cover to be further reduced.

BRIEF DESCRIPTION OF THE DRAWINGS

An illustrative embodiment of the invention is explained in more detail in the following description and accompanying Figures, wherein.

DETAILED DESCRIPTION OF THE INVENTION

Figure 1:
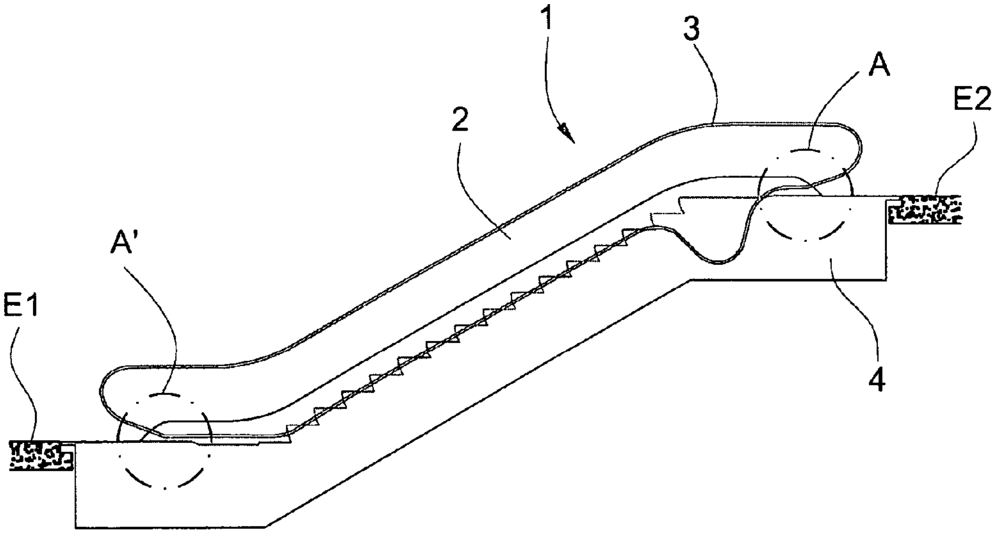
FIG. 1 is a schematic arrangement of an escalator in accordance with the invention.

The most significant components of an escalator 1 are schematically illustrated in FIG. 1. A circulating, endless step belt, which is driven by a drive unit by way of a transport chain drive wheel unit, is integrated in the escalator support construction.

In FIG. 1 there can be seen an escalator 1 with a glass balustrade 2, as well as a handrail 3 and a framework 4. Detail A and a second detail A' indicate the locations for the finger contact protection covers 6 on the escalator.

Figure 2:
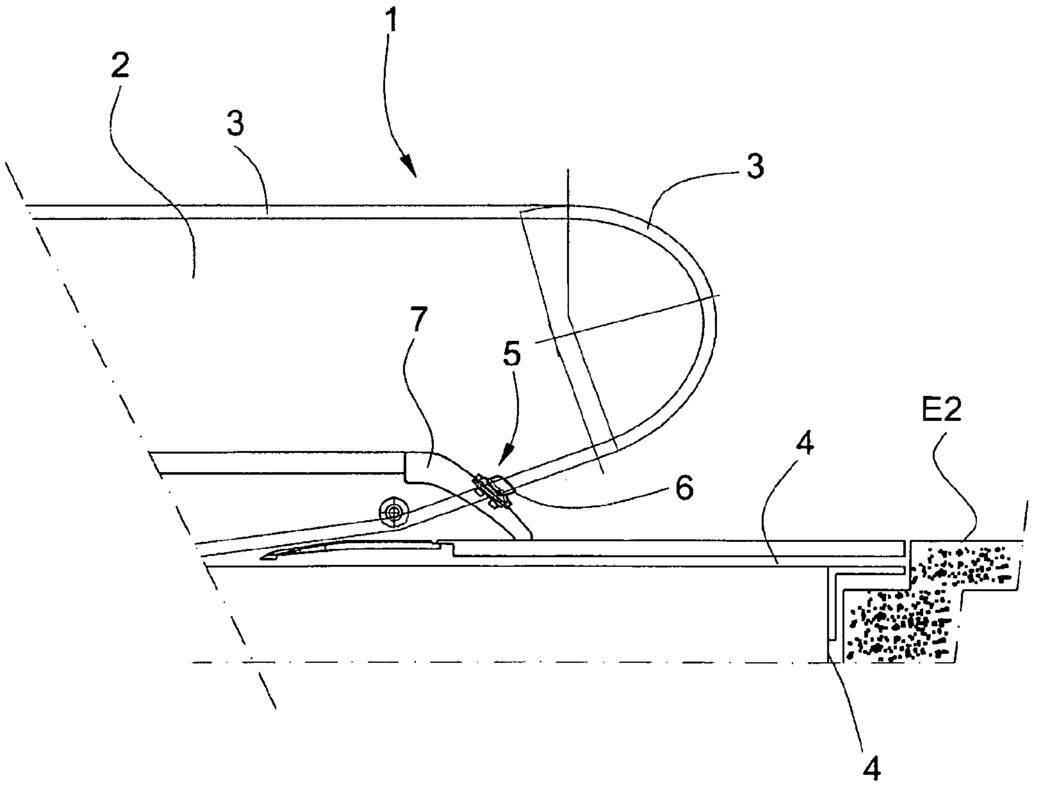
FIG. 2 is a detail schematic representation of the region of handrail entry of the escalator.

FIG. 2 further depicts the area of detail A/A', and shows the handrail entryway with the finger contact protection cover 6.

Figure 3:
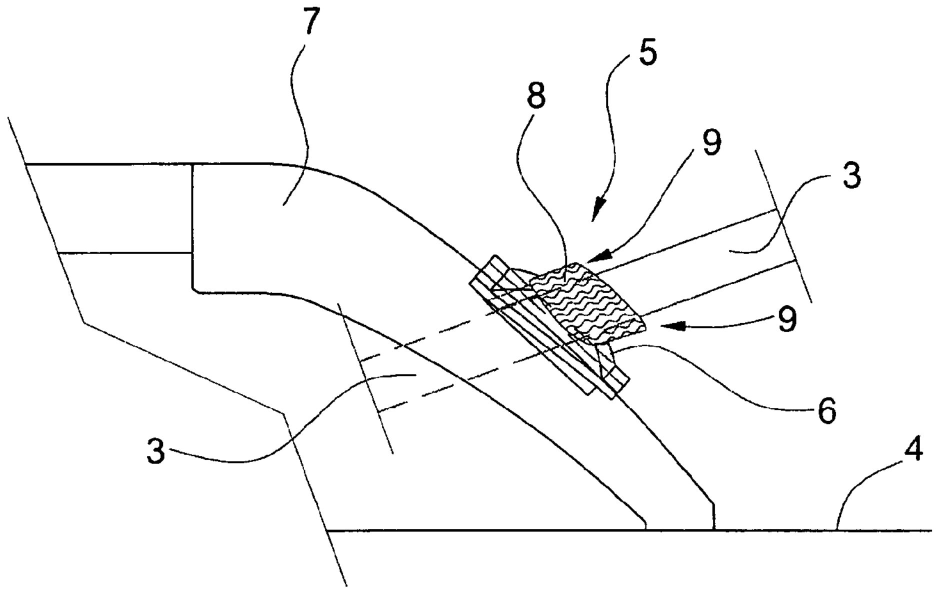
FIG. 3 depicts the handrail entry.

In FIG. 3 detail A/A' can be seen on an enlarged scale, and shows the finger contact protection cover 6 and the handrail 3 as well as the corrugated bristles 8 plus the front (end) plate or front cap 7 on which the contact protection cover 6 is mounted. The bristles 8 are mounted on the cover in an outward-extending manner to fully-surround the handrail, while a small gap or air gap 9 is present between the handrail 3 and the bristles.

Figure 4:
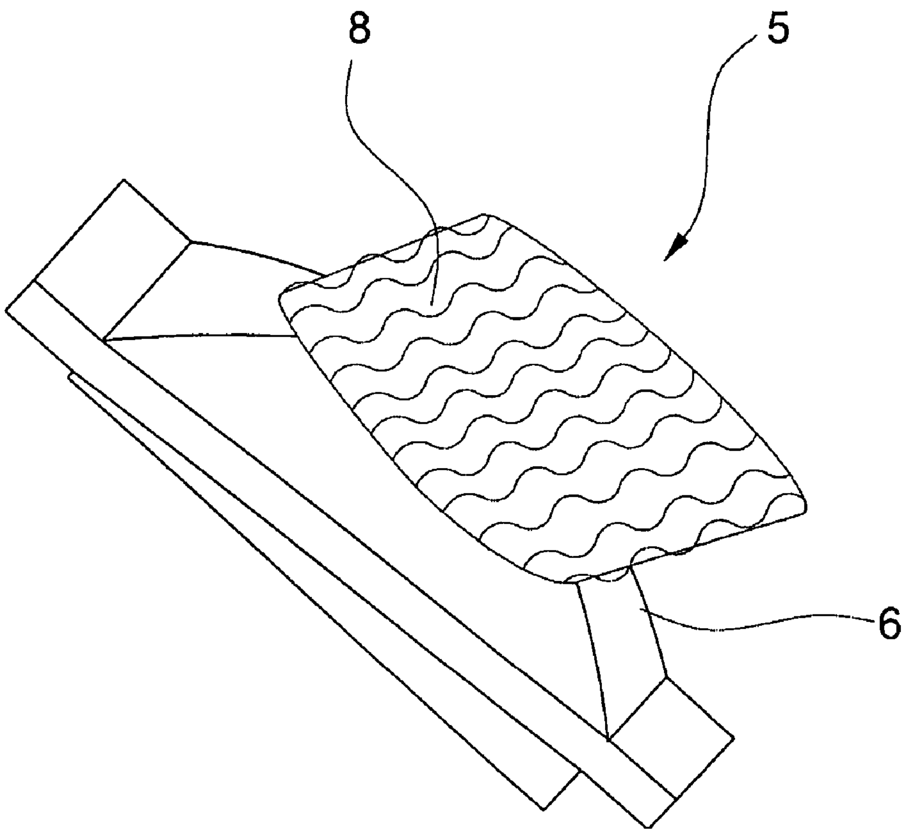
FIG. 4 is a detail view of finger contact protection cover of the invention.

In FIG. 4 there can be seen the finger contact protection cover 6 as an individual part. The corrugated bristles 8 are particularly readily apparent here.

As FIG. 4 clarifies, the finger contact protection cover 6 comprises corrugated bristles 8 which are characterised by better shape stability, higher mechanical strength and longer service life than those of straight bristles.

According to a preferred embodiment of the invention the exposed ends of the bristles are rounded. This is advantageous, because the risk of injury to a passenger finger on contact with the bristles is reduced.

The finger contact protection cover 6 carries out, according to the invention, several tasks at the same time. It prevents penetration of foreign bodies—pieces of newspaper, plastic bag components, pebbles, clothing threads and coarser pieces of dirt as well as snow and ice.

Reaching in by persons, particularly small children, is prevented by the corrugated bristles. As a consequence thereof, it is not possible for a hand to follow or be led by the driven handrail 3 into the handrail entryway 5.

Moreover, the finger contact protection cover forms a visual closure for the escalator or the moving walkway relative to the glass balustrade 2.

The corrugated bristles substantially reduce, by their density, the gap or air gap 9 between the running, driven handrail 3 and the finger contact protection cover 6, wherein the risk of penetration of a passenger finger into the gap or air gap 9 is further reduced.

Moreover, through the use of the corrugated bristles 8 and the density thereof, the running in and disappearance of the driven handrail 3 into the front (end) plate or front or end caps 7 are concealed and more fully protected. The handrail entryway 5 is usually hidden and not visible to the eyes of passengers or users of the escalator or moving walkway 1.

The bristles may have a thickness of from 0.3 to 1.5 mm, with a thickness of 0.7 mm being employed in practice. The height of the bristle corrugations may range from 1.0 to 4.5 mm, with a practiced height of 2.0 mm, while the length of the corrugations may be in the range of 4.0 to 12.5 mm, with a length of 8.0 mm being employed.

Through use of the waved bristles 8 there is effected a more luxuriant arrangement of the bristles, without, however, having to undertake an increase in the quantity of bristles. The handrail entry or handrail introduction 5 is tighter than with conventional bristles for the same number of bristles.

As is shown in FIG. 3, it is of advantage if the handrail entryway 5 is mounted at an end cap 7 which fastened to the balustrade 2. This solution enables the quick and simple mounting of the corrugated bristles 8 at the escalator and reduces costs for production and mounting. The air gap between the cover and handrail may be in the range of 1.5 to 5.0 mm, with a spacing of 4.0 being typically employed. The bristles form a gap of between 2.0 and 6.5 mm, with a gap size of 5.5 being utilized in association with a cover gap of 4.0 mm.

We claim:

1. An escalator or moving walkway with a handrail and a handrail entryway having a finger contact protection cover, characterized in that the finger contact protection cover comprises corrugated bristles.

2. The escalator or moving walkway according to claim 1, characterized in that the corrugated bristles are located and arranged to provide a gap of between about 2.0 and 6.5 mm between the handrail and the bristles.

3. The escalator or moving walkway according to claim 1 or 2, characterized in that the handrail entry is mounted at an end cap fastened to a balustrade.

4. The escalator or moving walkway according to one of claim 1 or 2, characterized in that ends of the bristles are rounded.

5. The escalator or moving walkway according to claim 1 or 2, wherein the bristles have a thickness of between 0.3 and 1.5 mm and corrugations having a height of between 1.0 and 4.5 mm and a length of between 4.0 and 12.5 mm.

6. The escalator or moving walkway according to claim 3, characterized in that exposed ends of the bristles are rounded.

7. The escalator or moving walkway according to claim 5, characterized in that the exposed ends of the bristles are rounded.

8. A handrail entryway for an escalator or moving walkway, the entryway having a finger contact protection cover, characterized in that finger contact protection cover has corrugated bristles.

9. A method of substantially reducing a gap between a handrail and a finger contact protection cover of a handrail entryway of an escalator or moving walkway, characterized in that corrugated bristles are mounted upon the finger contact protection cover.

* * * * *